United States Patent
Tsao et al.

(10) Patent No.: US 10,388,318 B2
(45) Date of Patent: Aug. 20, 2019

(54) DISC DRIVE HAVING DISC POSITIONING STRUCTURE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Chun Tsao, Taipei (TW); Yen-Hung Lin, Taipei (TW); Howard Yuen-Ho Shaw, Taipei (TW); Chien-Shou Chen, Taipei (TW)

(73) Assignees: LITE-ON ELECTRONICS (GUANGZHOU) LIMTED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/947,974

(22) Filed: Apr. 9, 2018

(65) Prior Publication Data
US 2019/0228802 A1 Jul. 25, 2019

(30) Foreign Application Priority Data
Jan. 25, 2018 (CN) .......................... 2018 1 0072789

(51) Int. Cl.
*G11B 17/028* (2006.01)
*G11B 33/06* (2006.01)

(52) U.S. Cl.
CPC .......... *G11B 17/0286* (2013.01); *G11B 33/06* (2013.01)

(58) Field of Classification Search
CPC .............................. G11B 17/028; G11B 33/00
See application file for complete search history.

(56) References Cited

U.S. PATENT DOCUMENTS

| 7,634,781 | B2* | 12/2009 | Hoshinaka | G11B 17/051 720/623 |
| 8,060,897 | B2* | 11/2011 | Wang | G11B 17/056 720/651 |
| 8,234,664 | B2* | 7/2012 | Wu | G11B 17/0515 720/623 |
| 8,255,935 | B2* | 8/2012 | Miyata | G11B 17/051 720/623 |
| 2003/0053401 | A1* | 3/2003 | Ogasawara | G11B 17/0285 720/706 |

(Continued)

*Primary Examiner* — Brian E Miller
(74) *Attorney, Agent, or Firm* — McClure, Qualey & Rodack, LLP

(57) ABSTRACT

A disc drive has an opening portion for inserting a disc. The disc drive includes a driving unit, a moving member, a traverse, a disc positioning structure and a restoring structure. When the disc is intended to be clamped on the traverse, the driving unit drives the moving member to move the traverse to a disc holding position to clamp the disc; and the moving member moves the disc positioning structure to a disc release position so that the disc positioning structure does not contact the disc. When the disc is intended to be released from the traverse, the driving unit drives the moving member to move the traverse to a disc unloading position to unload the disc; and the restoring structure moves the disc positioning structure to a disc loading position to support the disc.

9 Claims, 7 Drawing Sheets

(56) References Cited

U.S. PATENT DOCUMENTS

| | | | | |
|---|---|---|---|---|
| 2006/0026620 | A1* | 2/2006 | Shirakawa | G11B 17/028 720/658 |
| 2006/0064707 | A1* | 3/2006 | Yang | G11B 17/051 720/623 |
| 2008/0030898 | A1* | 2/2008 | Wada | G11B 17/028 360/133 |
| 2008/0104623 | A1* | 5/2008 | Wu | G11B 17/028 720/689 |
| 2008/0163275 | A1* | 7/2008 | Eguchi | G11B 17/0288 720/623 |
| 2009/0031332 | A1* | 1/2009 | Fujisawa | G11B 17/0288 720/601 |
| 2009/0037944 | A1* | 2/2009 | Yasaki | G11B 17/028 720/703 |
| 2009/0125927 | A1* | 5/2009 | Fukasawa | G11B 17/028 720/661 |

\* cited by examiner

DISC DRIVE HAVING DISC POSITIONING STRUCTURE

This application claims the benefit of People's Republic of China application Serial No. 201810072789.X, filed Jan. 25, 2018, the subject matter of which is incorporated herein by reference.

BACKGROUND OF THE INVENTION

Field of the Invention

The invention relates in general to a disc drive, and more particularly to a disc drive having a disc positioning structure.

Description of the Related Art

Because of the popularity of discs, disc drives for reading data from a disc and storing data in the disc have a significant importance in the multimedia market. The conventional tray-type disc drive has a tray and a tray motor. The tray is used to carry a disc, and the tray motor is used to drive the tray into or out of the disc drive, so that the user can put the disc into the disc drive or remove the disc from the disc drive.

However, the internal structure of a disc drive that carries a disc on a tray is complicated, and when the tray is ejected from the disc drive too quickly and fails to eject smoothly, the tray may seriously wobble or the tray motor may be damaged. When the tray is going to eject from the disc drive, the space for the ejected tray needs to be reserved first. Otherwise, the tray cannot be completely ejected. Therefore, the tray-type disc drive occupies more space. On the other hand, if the disc drive does not require a tray, the space for the ejected tray can be reduced, and the internal structure of the disc drive can be simplified.

SUMMARY OF THE INVENTION

The invention is directed to a tray-less disc drive to simplify the internal structure of the disc drive, and there is no need to reserve a space for the ejected tray.

According to a respect of the present invention, a disc drive having an opening portion for inserting a disc is provided. The disc drive includes a driving unit, a moving member, a traverse, a disc positioning structure and a restoring structure. The driving unit connects the moving member for driving the moving member to move. The traverse connects the moving member, and the moving member moves with the traverse. The disc positioning structure is disposed on the side of the disc drive away from the opening portion. The restoring structure connects the disc positioning structure. When the disc is intended to be clamped on the traverse, the driving unit drives the moving member to move the traverse to a disc holding position to clamp the disc, and the moving member moves the disc positioning structure to a disc release position so that the disc positioning structure is not in contact with the disc; when the disc is intended to be released from the traverse, the driving unit drives the moving member to move the traverse to a disc unloading position so as to unload the disc and the restoring structure moves the disc positioning structure to a disc loading position to support the disc.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. The disc drive 100 shown in the following embodiments is only described for elements related to the present invention, and the remaining elements of the disc drive 100 which are well-known in the art are not described here again.

Figure 1A:
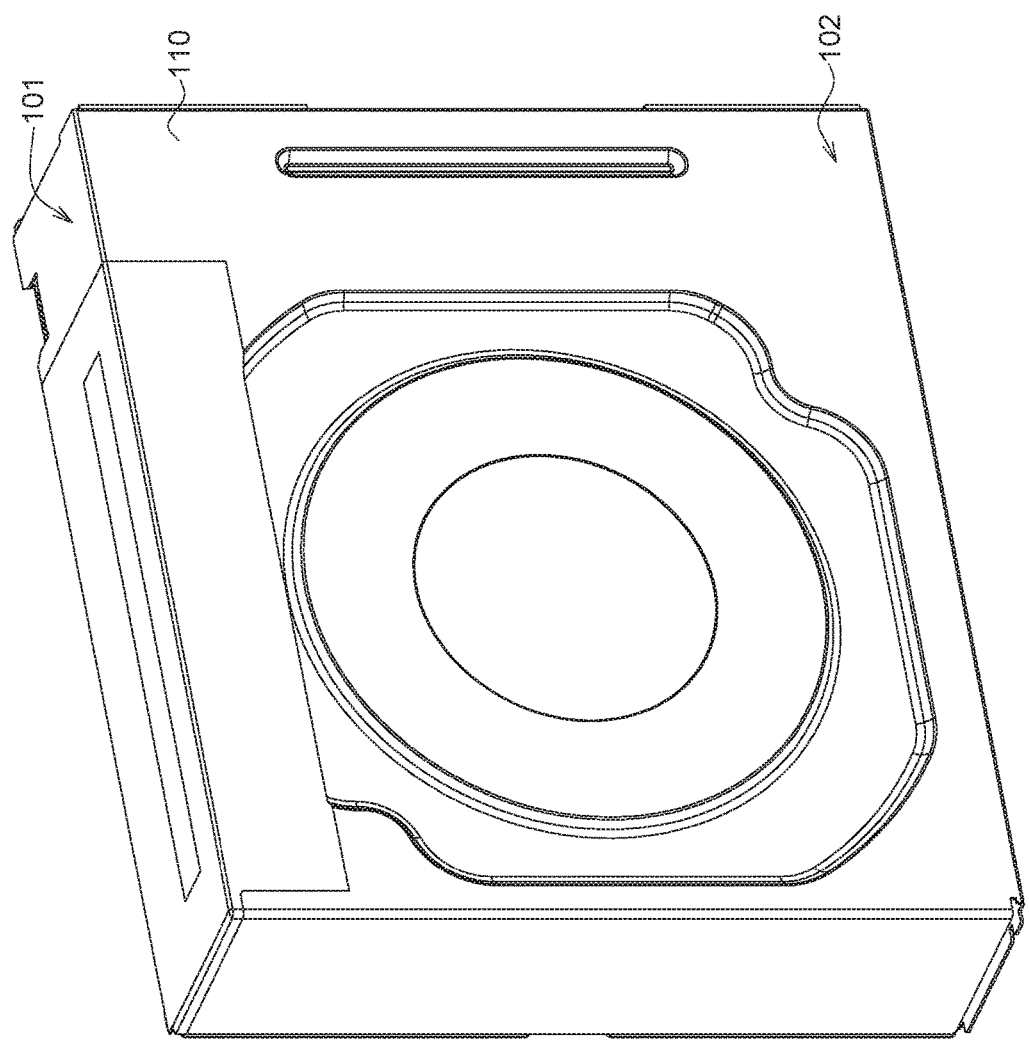
FIG. 1A is a schematic diagram of a disc drive according to an embodiment of the present invention.
Figure 1B:
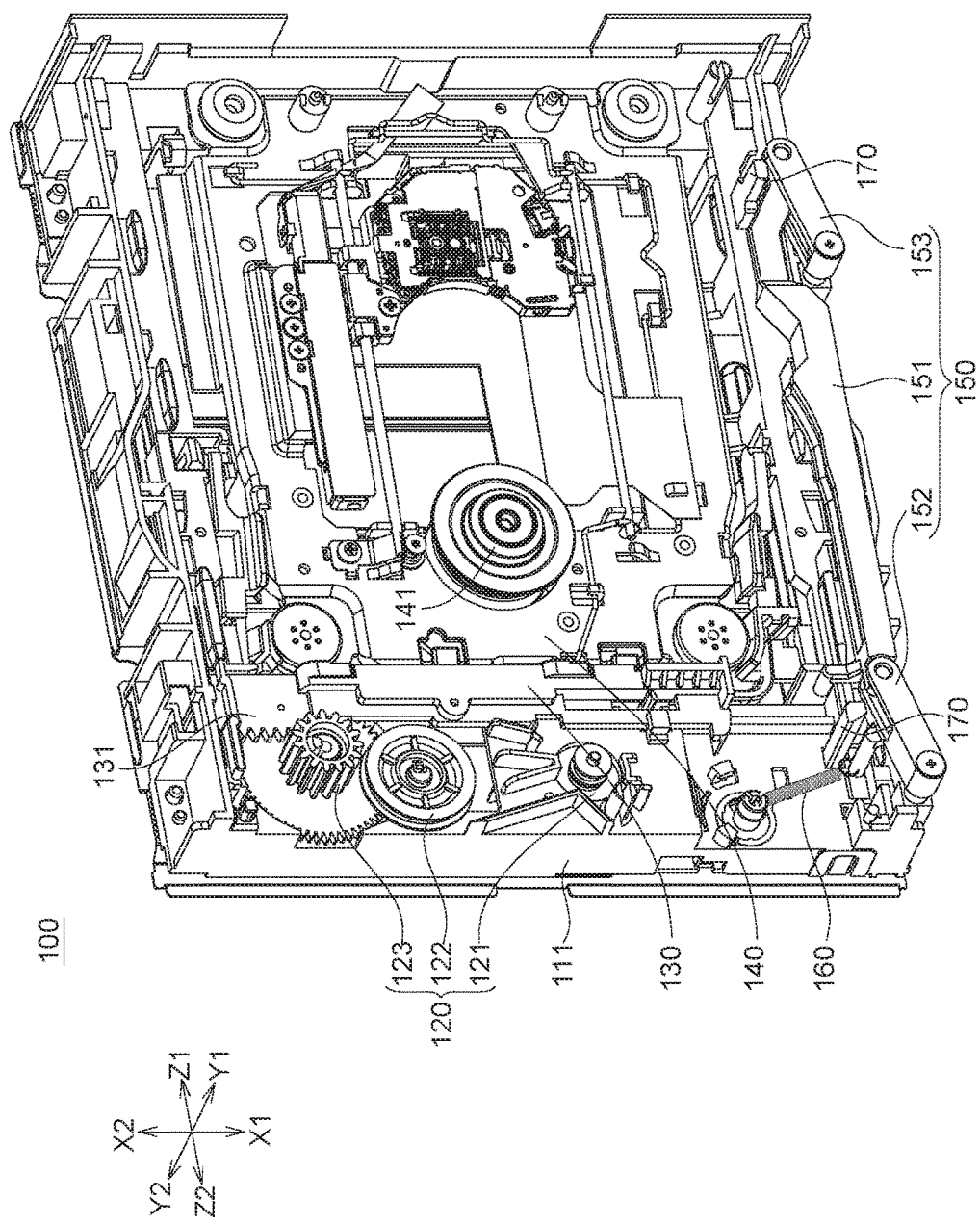
FIG. 1B is a schematic diagram of an internal of a disc drive according to an embodiment of the present invention.
Figure 1C:
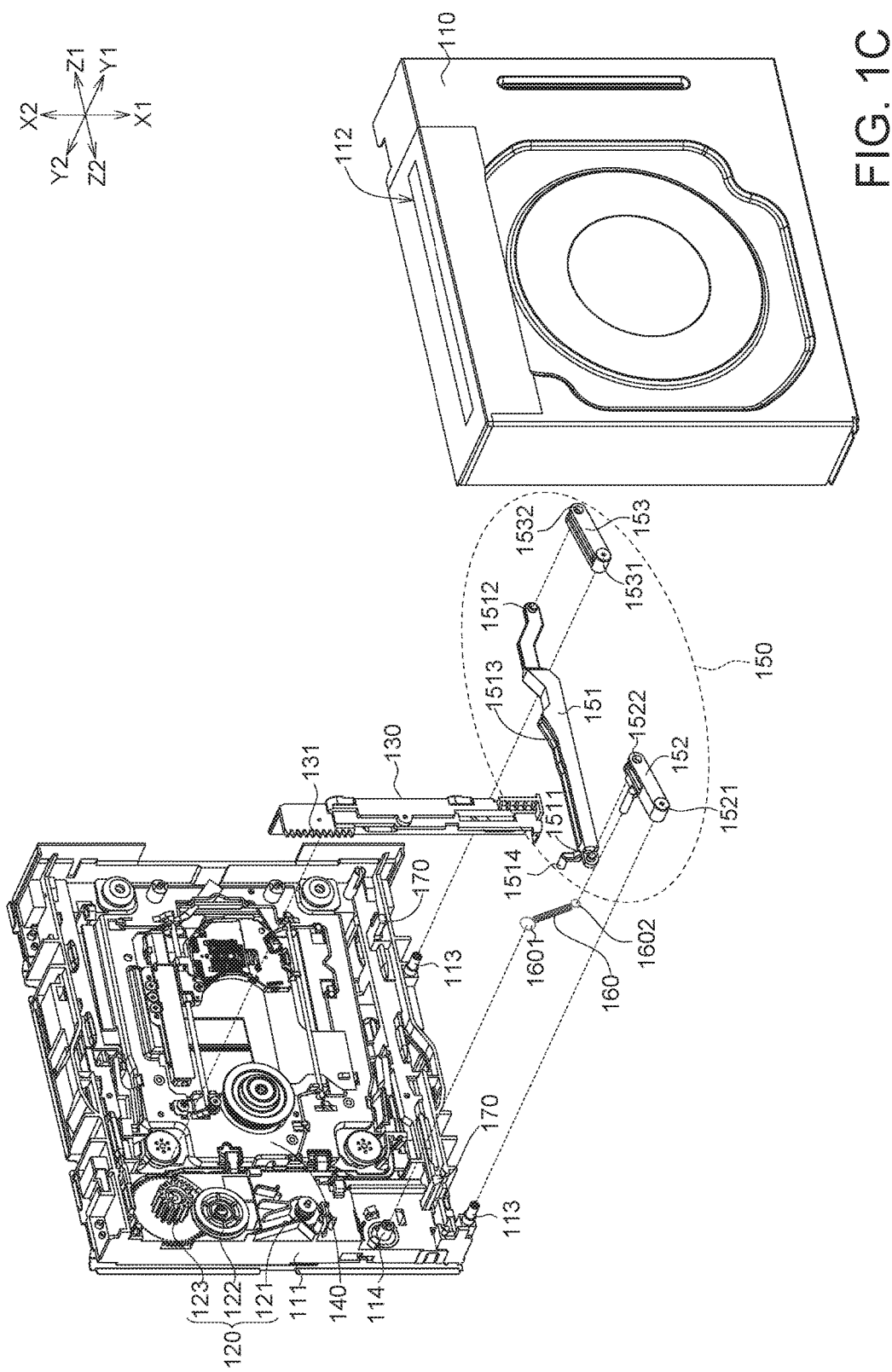
FIG. 1C is a schematic exploded diagram of main components of a disc drive according to an embodiment of the present invention.
Figure 1D:
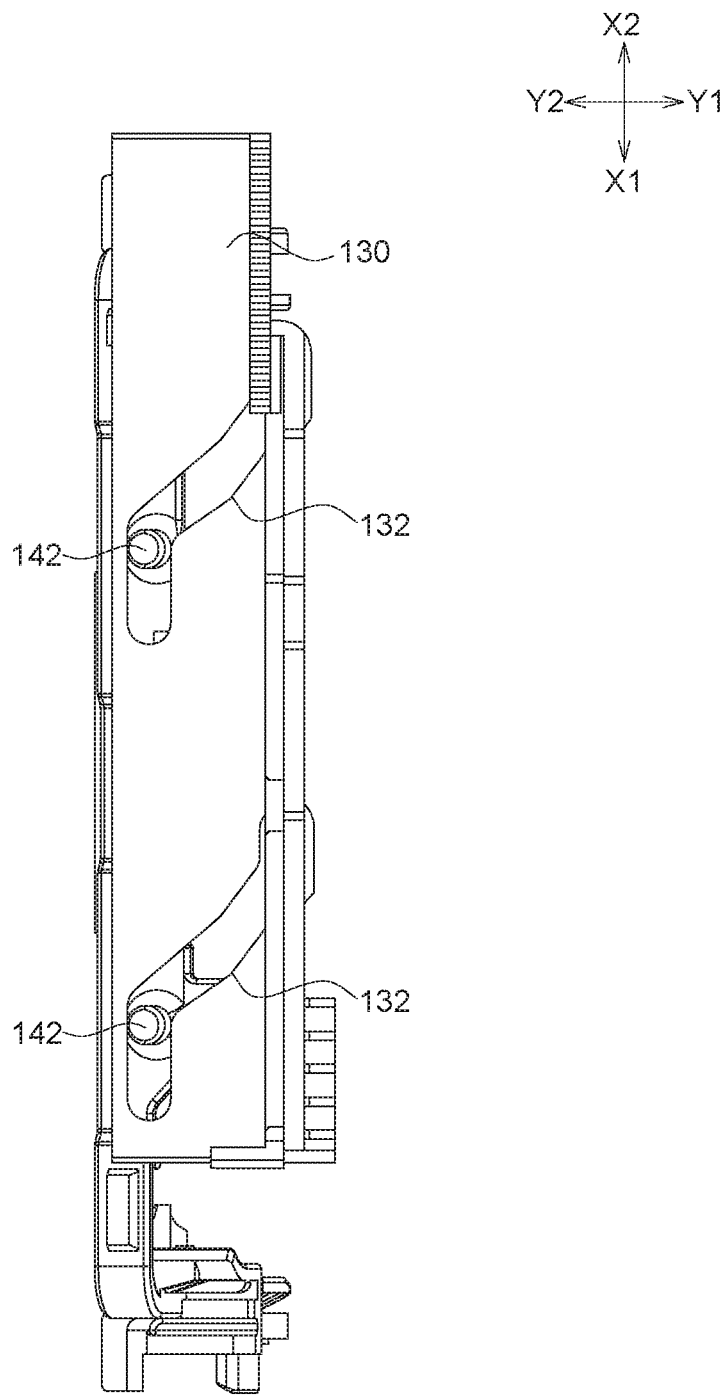
FIG. 1D is a schematic diagram illustrating an up-and-down movement of a traverse using a guide groove of a moving member according to an embodiment of the present invention.
Figure 2:
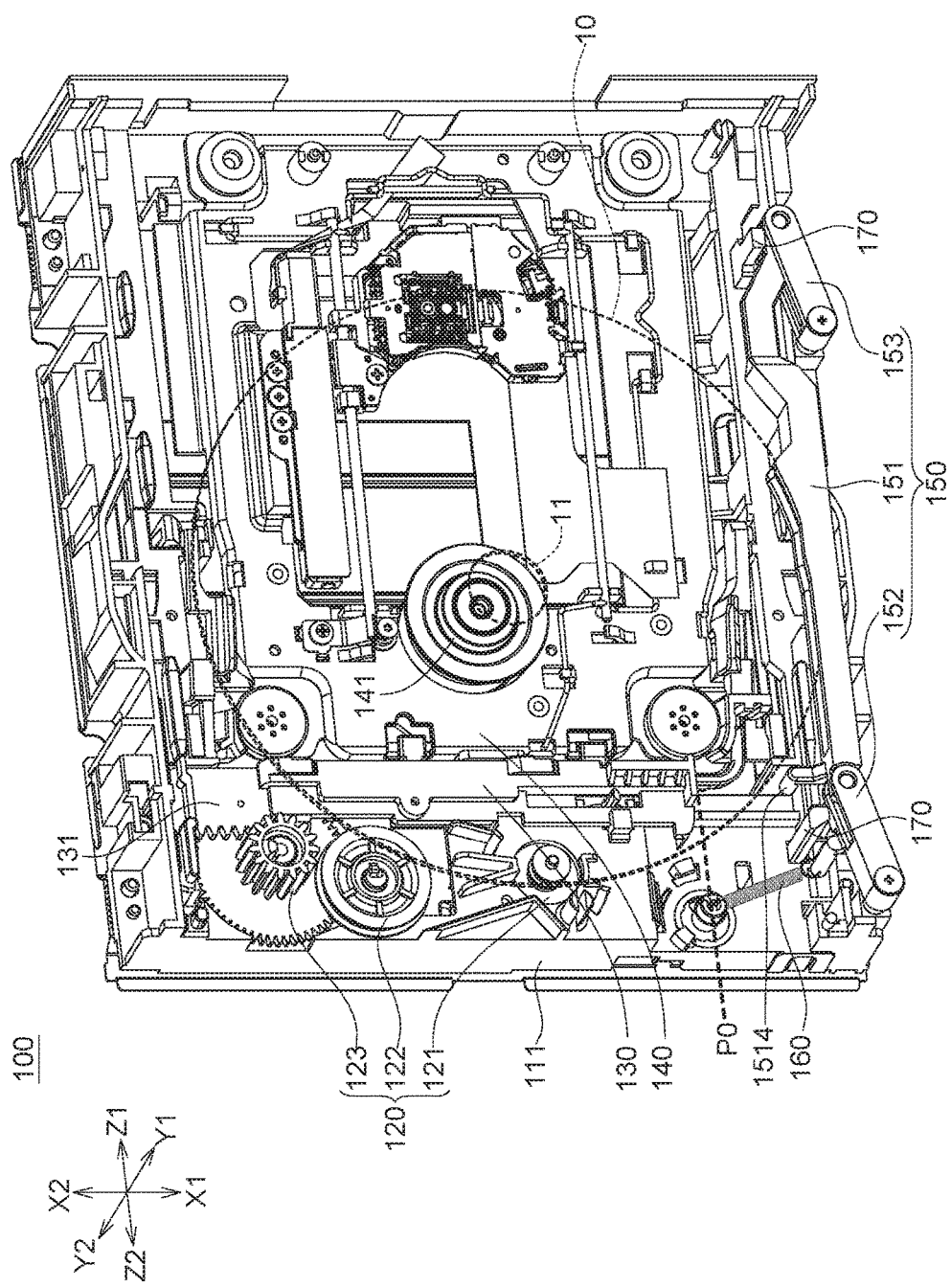
FIG. 2 is a schematic diagram of an internal of a disc drive when the disc is inserted into the disc drive.
Figure 3:
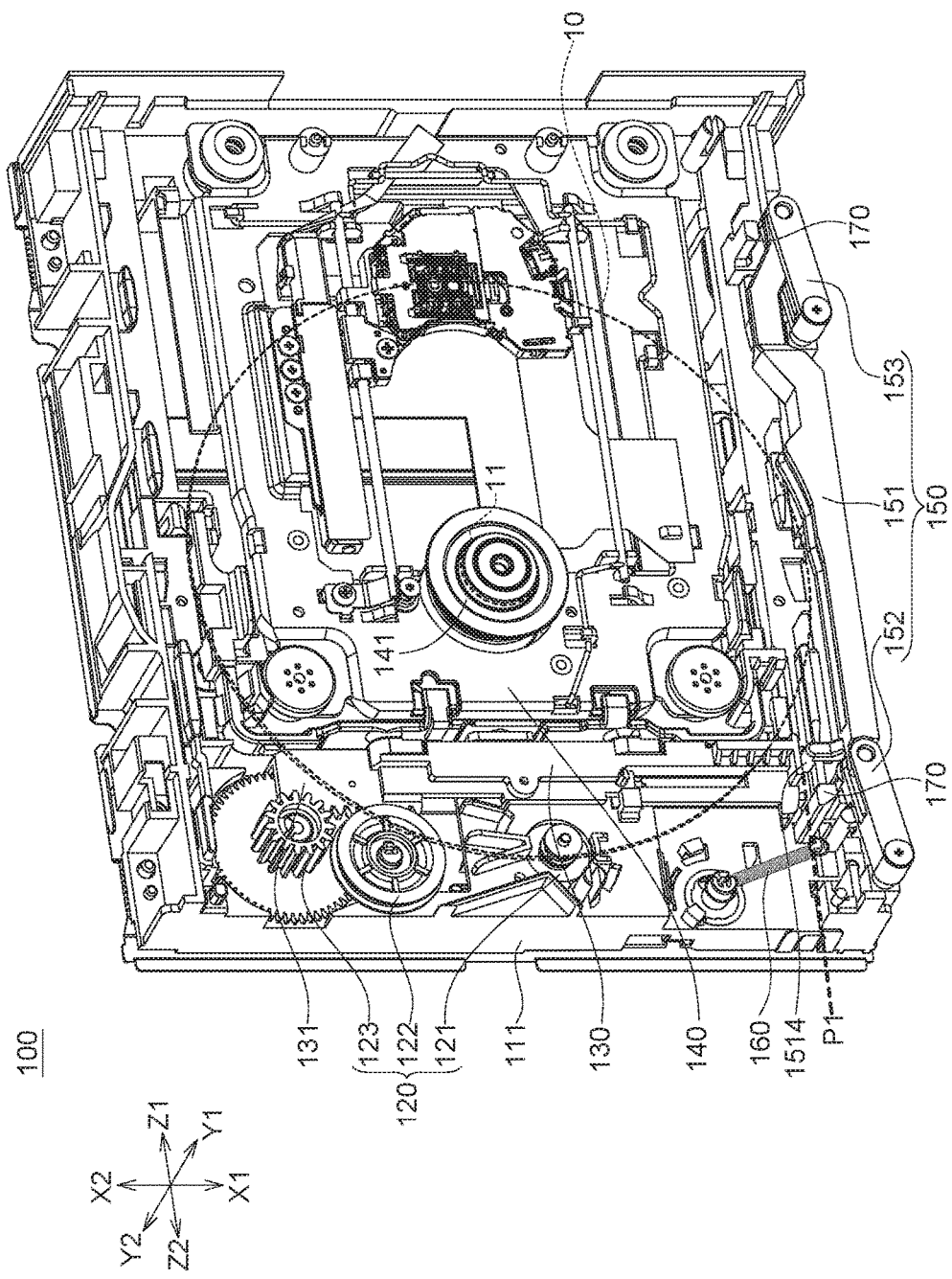
FIG. 3 is a schematic diagram of an internal of a disc drive when the disc is clamped on the traverse.
Figure 4:
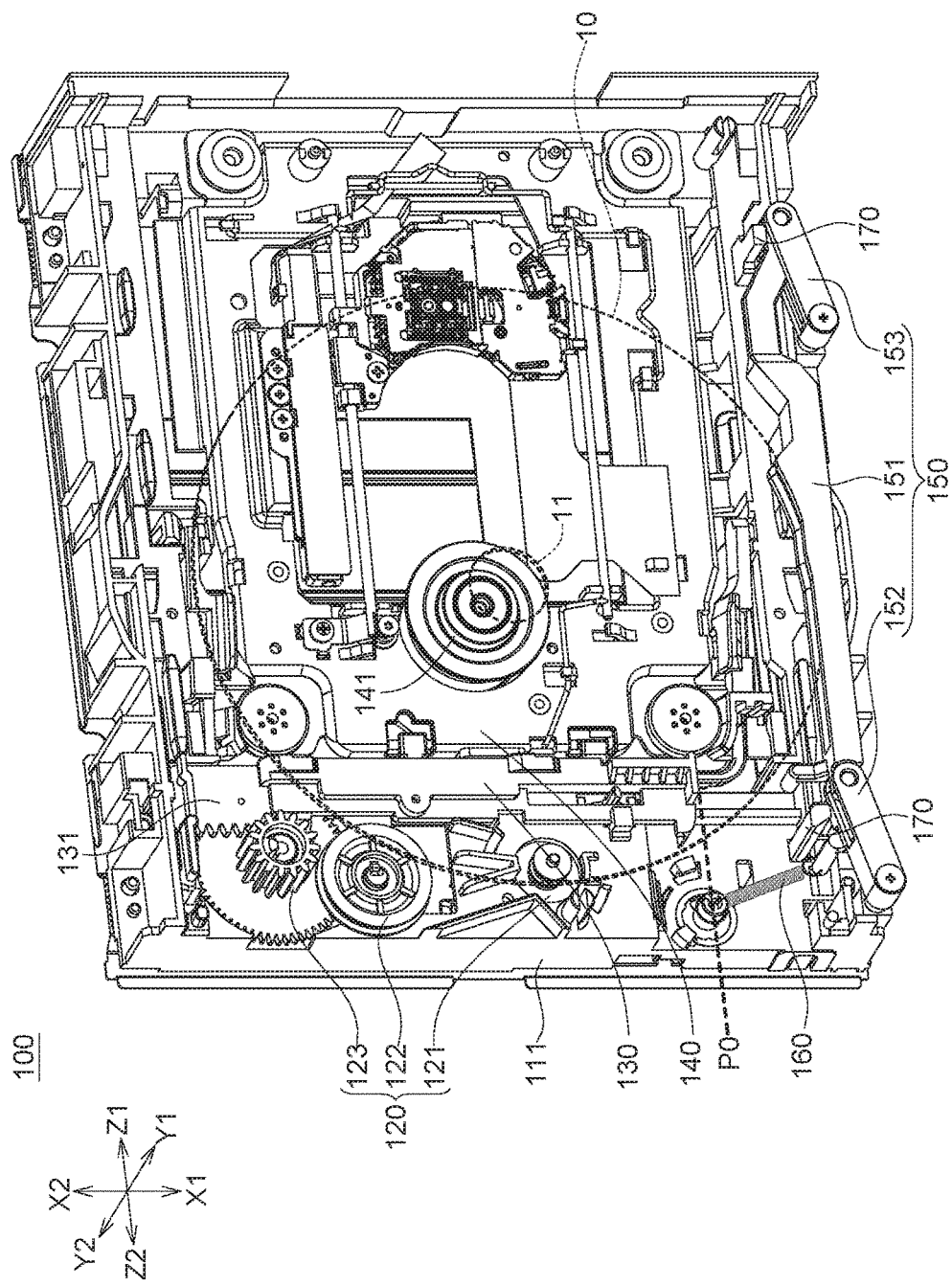
FIG. 4 is a schematic diagram of an internal of a disc drive when the disc is released from the traverse.

FIG. 1A is a schematic diagram of a disc drive 100 according to an embodiment of the present invention. FIG. 1B is a schematic diagram of an internal of the disc drive 100 according to an embodiment of the present invention. FIG. 1C is a schematic exploded diagram of main components of the disc drive 100 according to an embodiment of the present invention. FIG. 1D is a schematic diagram illustrating an up-and-down movement of a traverse 140 of the disc drive 100 using a guide groove 132 of the moving member 130 according to an embodiment of the present invention. FIG. 2 is a schematic diagram of the internal of the disc drive 100 when the disc 10 (shown by dotted lines) is inserted into the disc drive 100. FIG. 3 is a schematic diagram of the internal of the disc drive 100 when the disc 10 (shown by dotted lines) is clamped on the traverse 140. FIG. 4 is a schematic diagram of the internal of the disc drive 100 when the disc 10 (shown by dotted lines) is released from the traverse 140.

Referring to FIGS. 1A to 1D, the disc drive 100 according to an embodiment of the present invention includes a housing 110, a driving unit 120, a moving member 130, a traverse 140, and a disc positioning structure 150. The housing 110 has an opening portion 112 for inserting a disc 10. In FIG. 1A, the housing 110 is in an upright position, the opening portion 112 is located on the top surface 101 of the disc drive 100, and the user can insert the disc 10 from the top of the disc drive 100. Therefore, instead of using a conventional tray, the disc 10 is supported by the disc positioning structure 150 disposed in the housing 110, as shown in FIG. 2.

Referring to FIGS. 1B, 1C, and 1D, the driving unit 120 is disposed on the base 111 in the housing 110. The driving unit 120 includes a motor 121, a pulley 122, and a set of gears 123. The moving member 130 is disposed on the base 111 and includes a rack 131. The rack 131 and the gears 123 are connected in a meshed manner. The traverse 140 is disposed on the base 111 and one end of the traverse 140 adjacent to the moving member 130 is provided with two protrusions 142, for example, so that the traverse 140 is connected to the moving member 130 by the two protrusions 142. According to an embodiment of the invention, the two protrusions 142 are correspondingly inserted into two step-shaped (Z-shaped) guide grooves 132 of the moving member 130. The two step-shaped guide grooves 132 extend along the moving direction of the moving member 130 (for example, the directions of X1 and X2), and the height of two step-shaped guide grooves 132 are changed in a direction (for example, the directions of Y1 and Y2) vertical to the moving direction of the moving member 130 so as to drive the two protrusions 142 to move along the two step-shaped guide grooves 132 so that one end of the traverse 140 adjacent to the moving member 130 have a change in height in the directions of Y1 and Y2. Thus, the turntable 141 of the traverse 140 can be locked with the center hole 11 of the disc 10 (as shown in FIG. 3) or the turntable 141 of the traverse 140 can be separated from the center hole 11 of the disc 10 (as shown in FIGS. 2 and 4). The direction of X1 is referred to a first direction, the direction of X2 is referred to a second direction, the direction of Y1 is referred to a third direction, the direction of Y2 is referred to a fourth direction, wherein the first direction X1 is opposite to the second direction X2, and the third direction Y1 is opposite to the fourth direction Y2, and the first direction X1 and the second direction X2 are perpendicular to the third direction Y1 and the fourth direction Y2.

In addition, the disc positioning structure 150 is disposed in the disc drive 100 and on one side of the disc drive 100 away from the opening portion 112. In an embodiment, the disc positioning structure 150 is located on a bottom side 102 opposite to the top surface 101 of the disc drive 100 to support the disc 10 loaded into the disc drive 100 from the vertical direction (i.e., the direction of X1 or gravity direction). Referring to FIGS. 1B and 1C, the disc positioning structure 150 is, for example, a multi-linkage structure, which includes a bearing member 151, a first pivotal member 152 and a second pivotal member 153. The bearing member 151 includes a first end portion 1511, a second end portion 1512, and a disc accommodating groove 1513. The first end portion 1511 is opposite to the second end portion 1512, and the disc accommodating groove 1513 is recessed in the bearing member 151. One end 1521 of the first pivotal member 152 is pivotally mounted on a fixed shaft 113 of the base 111, and the other end 1522 of the first pivotal member 152 is pivotally mounted on the first end portion 1511 of the bearing member 151. The first pivotal member 152 can rotate around the fixed shaft 113. One end 1531 of the second pivotal member 153 is pivotally mounted on the other fixed shaft 113 of the base 111, and the other end 1532 of the second pivotal member 153 is pivotally mounted on the second end portion 1512 of the bearing member 151. The second pivotal member 153 can rotate around the fixed shaft 113.

In addition, referring to FIGS. 1B and 1C, the base 111 of the disc drive 100 may further include a restoring structure and at least one limiting structure 170. In an embodiment, the restoring structure is a spring 160, one end 1601 of the spring 160 may be connected to a rod 114 of the base 111, and the other end 1602 of the spring 160 may be connected to the disc positioning structure 150 to apply a pre-force to the disc positioning structure 150. In an embodiment, the spring 160 is connected to the first pivotal member 152. In addition, when the spring 160 applies a pre-force to the disc positioning structure 150 to drive the disc positioning structure 150 to move, the limiting structure 170 is used to block the first pivotal member 152 and the second pivotal member 153 from rotating so that the disc positioning structure 150 can stop at the disc loading position (as shown in FIGS. 2 and 4).

Referring to FIGS. 2 and 3, after the disc 10 is loaded in the disc drive 100, if the disc 10 is intended to be clamped on the turntable 141 of the traverse 140 for reading data from the disc 10 or writing data in the disc 10, the driving unit 120 drives the moving member 130 to move along the first direction X1 to a first position P1, and the moving member 130 moves the traverse 140 toward the third direction Y1 to a disc holding position to clamp the disc 10. In addition, when the moving member 130 moves along the first direction X1 to the first position P1, one end of the moving member 130 contacts with the disc positioning structure 150 to press the disc positioning structure 150 to a disc release position, that is, the first pivotal member 152 and the second pivotal member 153 are rotated to move the bearing member 151 downward in the first direction X1 and move the bearing member 151 rightward in the direction Z1. In an embodiment, the position adjacent to the first end portion 1511 of the bearing member 151 has a protruding structure 1514. The moving member 130 is in contact with the protruding structure 1514 to press the bearing member 151 downward, so that the first pivotal member 152 and the second pivotal members 153 respectively rotates around the fixed shafts 113 to move the bearing member 151 to the disc release position. When the disc positioning structure 150 moves to the disc release position, the disc 10 is separated from the disc accommodating groove 1513 due to the downward movement of the bearing member 151, so that the disc positioning structure 150 and the disc 10 do not contact with each other. At the same time, the disc 10 is clamped by the turntable 141 of the traverse 140, so that the traverse 140 can drive the disc 10 to rotate.

In contrast, referring to FIG. 4, if the disc 10 is intended to be released from the turntable 141 of the traverse 140, the driving unit 120 drives the moving member 130 to move along the second direction X2 to the initial position P0. The moving member 130 moves the traverse 140 toward the fourth direction Y2 to a disc unloading position to unload the disc 10. In addition, when the moving member 130 moves along the second direction X2 to the initial position P0, the spring 160 moves the disc positioning structure 150 to the disc loading position so as to support the disc 10, that is, the spring 160 moves the first pivotal member 152 upwards to make the first pivotal member 152 rotate around the fixed shaft 113, and thereby moves the second pivotal member 153 to rotate around the fixed shaft 113 so that the bearing member 151 moves upward in the second direction X2 and moves leftward in the direction Z2. At the same time, since the disc 10 has been released from the turntable 141 of the traverse 140, the disc 10 would fall into the disc accommodating groove 1513.

In the present embodiment, the spring 160 may be replaced with another restoring structure having the same function, such as an elastic piece, and the invention is not limited to implement with the spring 160. In addition, the disc positioning structure 150 may also be replaced with other positioning structures having the same function, and the present invention is not limited to implement with the multi-linkage structure.

The disc drive disclosed in the above embodiments of the present invention uses a moving member to move the multi-linkage structure and the traverse up and down to perform a disc loading and unloading operation. In an embodiment, the disc is inserted from the opening portion on the top surface of the disc drive, and the disc is supported by the disc positioning structure located on the bottom side opposite to the top surface of the disc drive. When the disc is intended to be clamped on the traverse, the moving member moves the traverse to a disc holding position to clamp the disc, and the moving member moves the disc positioning structure to a disc release position, so that the disc is not in contact with the disc positioning structure so as to complete the operation of clamping the disc. When the disc is intended to be released from the traverse, the moving member moves the traverse to a disc unloading position to unload the disc, and the restoring structure moves the disc positioning structure to a disc loading position to support the disc so as to complete the operation of unloading the disc. The disc drive of the present embodiment does not require a tray and thus the internal structure of the disc drive can be simplified, and there is no need to reserve the space for the ejected tray, and therefore the disc drive of the present embodiment occupies less space than the tray-type disc drive.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disc drive having an opening portion for inserting a disc, the disc drive comprising:
    a driving unit;
    a moving member connected to the driving unit, wherein the driving unit drives the moving member to move;
    a traverse connected to the moving member, wherein the moving member moves the traverse;
    a disc positioning structure disposed on a side of the disc drive away from the opening portion; and
    a restoring structure connected to the disc positioning structure,
    wherein when the disc is intended to be clamped on the traverse, the driving unit drives the moving member to move the traverse to a disc holding position to clamp the disc, and the moving member moves the disc positioning structure to a disc release position so that the disc positioning structure does not contact the disc;
    when the disc is intended to be released from the traverse, the driving unit drives the moving member to move the traverse to a disc unloading position to unload the disc, and the restoring structure moves the disc positioning structure to a disc loading position to support the disc;
    wherein the disc positioning structure comprises:
    a bearing member comprising a first end portion and a second end portion, wherein the first end portion is opposite to the second end portion;
    a first pivotal member, wherein one end of the first pivotal member is pivotally mounted on a fixed shaft of the disc drive, and the other end of the first pivotal member is pivotally mounted on the first end portion of the bearing member; and
    a second pivotal member, wherein one end of the second pivotal member is pivotally mounted on another fixed shaft of the disc drive, and the other end of the second pivotal member is pivotally mounted on the second end of the bearing member.

2. The disc drive according to claim 1, wherein the opening portion is located on a top surface of the disc drive, and the disc positioning structure is located on a bottom side of the disc drive opposite to the top surface.

3. The disc drive according to claim 2, wherein the disc positioning structure is used to support the disc inserted into the disc drive in a vertical direction.

4. The disc drive according to claim 1, wherein the bearing member comprises a protruding structure, and the moving member contacts the protruding structure to move the disc positioning structure to the disc release position.

5. The disc drive according to claim 1, wherein the bearing member comprises a disc accommodating groove for supporting the disc when the disc positioning structure moves to the disc loading position.

6. The disc drive according to claim 1, wherein the restoring structure is connected to the first pivotal member to move the disc positioning structure.

7. The disc drive according to claim 1, further comprises at least one limiting structure, used to block the first pivotal member or the second pivotal member from rotating, and to stop the disc positioning structure at the disc loading position when the restoring structure moves the disc positioning structure.

8. The disc drive according to claim 1, wherein the restoring structure is a spring or an elastic piece.

9. The disc drive according to claim 1, further comprises at least one limiting structure, used to block the disc positioning structure and stop the disc positioning structure at the disc loading position when the restoring structure moves the disc positioning structure.

* * * * *